United States Patent [19]

McCoy et al.

[11] 4,321,146

[45] Mar. 23, 1982

[54] DEMULSIFICATION OF BITUMEN EMULSIONS WITH A HIGH MOLECULAR WEIGHT MIXED ALKYLENE OXIDE POLYOL

[75] Inventors: David R. McCoy; Robert M. Gipson, both of Austin, Tex.; Kitchener B. Young, Ft. McMurray, Canada

[73] Assignees: Texaco Inc., White Plains, N.Y.; Texaco Canada, Inc., Ontario, Canada

[21] Appl. No.: 152,451

[22] Filed: May 22, 1980

[51] Int. Cl.$^3$ .................. B01D 17/04; C10G 1/00
[52] U.S. Cl. .................. 210/708; 208/11 R; 208/188; 252/331; 252/340
[58] Field of Search .......... 208/11 R, 11 LE, 188; 210/708; 252/328, 329, 331, 340–344, 358

[56] References Cited

U.S. PATENT DOCUMENTS

| | | | |
|---|---|---|---|
| 2,964,478 | 12/1960 | Monson | 252/331 |
| 3,330,757 | 7/1967 | Bichard | 252/331 X |
| 3,331,765 | 7/1967 | Canevari et al. | 252/331 X |

FOREIGN PATENT DOCUMENTS

| | | | |
|---|---|---|---|
| 546155 | 9/1957 | Canada | 252/340 |

*Primary Examiner*—Thomas G. Wyse
*Attorney, Agent, or Firm*—Carl G. Ries; Robert A. Kulason; Kenneth R. Priem

[57] ABSTRACT

A process for recovering bitumen from oil-in-water (O/W) emulsions is disclosed wherein water soluble demulsifiers are used. These demulsifiers are polyols of 2 and greater functionality containing predominantly mixed ethylene oxide and propylene oxide wherein the ethylene oxide content of the polyol (by weight) is greater than about 70% but less than about 95%. The molecular weight of these polyols is greater than about 10,000. To resolve the bituminous petroleum emulsions, the process is carried out between 25° and 120° C. wherein the demulsifier of the invention is contacted with the bituminous emulsion.

5 Claims, No Drawings

DEMULSIFICATION OF BITUMEN EMULSIONS WITH A HIGH MOLECULAR WEIGHT MIXED ALKYLENE OXIDE POLYOL

BACKGROUND OF THE INVENTION

1. Field of the Invention

This invention is concerned with the breaking or resolution of oil-in-water (O/W) bituminous emulsions by treatment with water soluble mixed ethylene oxide/propylene oxide polyols of relatively high molecular weight containing ethylene oxide and propylene oxide.

2. Description of the Prior Art

A great volume of hydrocarbons exist in known deposits of tar sands. These deposits occur at various places, the Athabasca tar sands in Canada being an example. The petroleum in a tar sand deposit is an asphaltic bitumen of a highly viscous nature ranging from a liquid to a semi solid. These bitumeninous hydrocarbons are usually characterized by being very viscous or even non flowable under reservoir conditions by the application of driving fluid pressure.

Where surface mining is not feasible, the bitumen must be recovered by rendering the tar material mobile in situ and producing it through a well penetrating the tar sand deposit. These in situ methods of recovery include thermal, both steam and in situ combustion and solvent techniques. Where steam or hot water methods are used, a problem results which aggravates the recovery of the bitumen. The difficulty encountered are emulsions produced by the in situ operations. These emulsions are highly stable O/W emulsions which are made even more stable by the usual presence of clays. Most liquid petroleum emulsions are water-in-oil (W/O) types. These normal W/O emulsions are broken by methods known in the art. However, the bitumen emulsions which are O/W types present a much different problem, and the same demulsifiers used in W/O emulsions will not resolve the O/W bitumen emulsions. The uniqueness of these O/W bitumen emulsions is described in prior art reference A: C. W. W. Gewers, *J. Canad. Petrol. Tech.*, 7(2), 85–90 (1968). There is much prior art concerning the resolution of normal W/O emulsions. Some of the art even mistakenly equates bitumen O/W emulsions with these W/O emulsions. The following is a list of several additional art references.

B. N. Schonfeldt, *Surface Active Ethylene Oxide Adducts*, Pergamon Press, New York, 1969, Section 4.11.2, pp 577–582 describes the types of chemical demulsifiers used to treat standard crude oil emulsions of the W/O type. Included are the Pluronic surfactants having 20–30 wt. % ethylene oxide in the structure.

C. In U.S. Pat. No. 4,139,451, tar-water from a coking operation is demulsified with

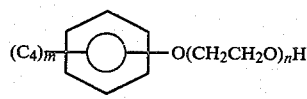

where $m=2$ or 3, $n=12$.

D. Chem. Abstr. 90 206927z discloses the use of

where $n=2.9$ or 3.1 in $H_2O$ to extract bitumen from Athabasca tar sands in the presence of kerosine, presumedly active because of its ability to stabilize the W/O emulsions formed.

E. Several Esso Patents by Canevari, et. al. (U.S. Pat. No. 3,296,117; 3,331,765; 3,893,907) disclose mechanical demulsification processes for tar sand emulsions involving mixtures of one or more of the following demulsifiers: acid esters of ethoxylated alkylphenol-formaldehyde condensates; amine alkoxylates from 40:60 to 60:40 mixtures of ethylene oxide and propylene oxide, and Pluronic type surfactants. In U.S. Pat. No. 3,893,907 the structure of applicable Pluronics is given. According to the structure given, molecular weight may vary from 1,000 to over 16,000 but ethylene oxide content (by weight) is impossible to gauge due to an apparent error in the chemical structure as given. No examples of the use of Pluronics could be found in any of these patents.

F. J. A. Richard (Esso), U.S. Pat. No. 3,330,757 is as E above, but surfactants (which may be sorbitan type, standard nonionics, or Pluronics) are recommended to be in the HLB range of 10–18.

G. Texaco Canada was granted a recent patent U.S. Pat. No. 4,058,453 for breaking tar sand emulsions using high molecular weight poly(ethylene oxides) of greater than or equal to 100,000 molecular weight with optional addition of an alkaline earth metal halide.

H. U.S. Pat. No. 3,553,100 (Shell Oil) discloses a method for breaking tar sand emulsions utilizing a chemical demulsifier "in which ethylene oxide groups, acyl radicals and from about 10 to 22 carbon atoms are contained in each of the molecules of a surfactant that exhibits a significant amount of solubility in both oil and brine." The surfactant is presumedly of the type $$R-\overset{O}{\underset{\|}{C}}(OCH_2CH_2)_nOH.$$

I. U.S. Pat. No. 3,334,038 (Petrolite) discloses an electrical-chemical process for breaking tar sand emulsions utilizing a chemical demulsifier, a polyester of a polyalkyleneether glycol and a polycarboxylic acid.

Related application, Ser. No. 152,452 filed of even date contains experimental evaluation of some of the prior art demulsifiers described above. That information is incorporated herein by reference.

It is an object of the present invention to provide a method whereby O/W bitumen emulsions may be broken by treatment with a class of mixed ethylene oxide/propylene oxide polyols which would not be useful in the breaking of normal W/O emulsions.

SUMMARY OF THE INVENTION

The invention is a method for resolving or breaking O/W bitumen emulsions by contacting the emulsions at a temperature of between 25° and 120° C. with a water soluble polyol of about 2 to 8 functionality made by reacting mixed ethylene oxide and propylene oxide with polyol initiators wherein the ethylene oxide content is from about 68% and to about 95% and the molecular weight of the polyol is greater than about 10,000. The product may have discreet ethylene oxide or propylene oxide blocks in the initiator or in end caps. However, these one oxide blocks should comprise no more than about 50% or preferably 20% of the total molecular weight of the polyol.

DESCRIPTION OF THE PREFERRED EMBODIMENTS

The process of this invention provides a novel chemical demulsifier.

Prior art demulsifiers for O/W bitumen emulsions are either extremely high molecular weight alkylene oxide polymers which are very expensive (prior art Reference G), high molecular weight polyesters prepared from ethylene oxide (Reference H), or contain large discreet hydrophobic and hydrophilic portions in the molecule (Refs. B-F and I). The demulsifiers of the present invention are relatively inexpensive, have none of these structural characteristics and yet perform excellently as demulsifiers.

The polyol demulsifiers of this invention are made by alkoxylation of an initiator of the desired functionality having active hydrogens for the alkoxylation reaction. Many initiators are known to those skilled in the art. Illustrative of acceptable initiators are trimethylolpropane and glycerine, for example, if a functionality of three (3) is desired and sucrose, sorbitol, pentaerythritol and mannitol, for example, if a higher functionality is desired. Many common glycols, such as propylene glycol, may be used if a diol is desired.

In this invention, these initiators may be used as such or already alkoxylated to a low molecular weight usually not exceeding 500.

The produced bitumen emulsions may be treated in a conventional horizontal treater operated from about 25° to 120° C. and, preferably, from about 50° to 90° C. at atmospheric or slightly higher pressures. The concentration of the chemical demulsifier described above used in treating the bitumen in water emulsions may range from about 1 to 200 parts per million and, preferably, from about 10 to 100 parts per million with the optional addition of an organic diluent and/or inorganic salt as well as standard flocculants and mechanical or electrical means of demulsification. The following examples describe more fully the present process. However, these examples are given for illustration and are not intended to limit the invention.

EXAMPLE I

Preparation of Low Molecular Weight Sucrose Polyol

Two (2) pounds of sucrose 8-molar ethoxylate 9-molar propoxylate was charged to a stirred autoclave with 5 g potassium hydroxide, water was removed by stirring under reduced pressure for one (1) hour at 100° C., and 2 pounds of a 80:20 (w:w) mixture of ethylene oxide and propylene oxide was slowly added at 100°-115° C. and digested until no further pressure drop occurred. A portion of this product was withdrawn from the reactor and more oxide mixture added. This process was repeated (with additional KOH addition and stripping when the reaction rate became too sluggish) until a product of 69.4 basis hydroxyl number was obtained (about 6500 molecular weight) and 70 weight % oxyethylene content. When tested (Example XIIIa) this product did not perform well as a demulsifier for bitumen emulsions.

EXAMPLES II AND III

Preparation of Hydrophilic, Mixed Triols

A 5000 molecular weight triol was made by the base catalyzed addition of a 70 weight % ethylene oxide: 30% propylene oxide mixture to glycerol. To 3 lbs. of this triol were added a 90:10 (w:w) mixture of ethylene oxide: propylene oxide at 100°-120° C. under pressure in the presence of 5.4 g of KOH catalyst to give a product having an hydroxyl number of 11.7. (Example II).

To 5 lbs. of the product of Example II was added an additional 9.7 lbs. of 90:10 (w:w) ethylene oxide: propylene oxide mixture at 100° to 130° C. This triol had an hydroxyl number of 8.9. (Example III). When tested (Examples XIIIb and c), these products performed well and fairly well as demulsifiers for bitumen emulsions.

EXAMPLE IV

Preparation of High Molecular Weight Sucrose Polyol

The process of Example I was continued with more 80:20 mixed oxide to give a product of hydroxyl number 17.2 having an approximate molecular weight of 20,000 and containing about 80% oxyethylene units. When tested (Example XIIId) this product performed successfully as a demulsifier for bitumen emulsions.

EXAMPLE V

Preparation of Hydrophobic Triol

Using standard base-catalyzed alkoxylation in a stirred autoclave, glycerol was treated successively with 44 moles propylene oxide, 7 moles ethylene oxie, 50 moles propylene oxide, and 14 moles ethylene oxide to prepare a 6500 molecular weight product containing 14.2 weight % oxyethylene units. When tested (Example XIIIf), this product failed as a demulsifier for bitumen emulsions.

EXAMPLE VI

Preparation of High Molecular Weight Diol

Using standard base-catalyzed alkoxylation in a stirred autoclave, a 10,000 molecular weight diol was prepared from a mixture of 75 weight percent ethylene oxide and 25 weight percent propylene oxide. When tested on identical emulsions (Example XIIIg), this product compared well with a known bitumen demulsifier (Example XIIIh).

EXAMPLE VII

Preparation of Low Molecular Weight Triol

Using standard base-catalyzed alkoxylation techniques glycerol was treated with a mixture of 70 wt. % ethylene oxide and 30 wt. % propylene oxide to prepare a 9,000 molecular weight hydrophilic triol. When tested (Example XIIIi), this product failed as a demulsifier for bitumen emulsions.

EXAMPLE VIII

Preparation of Sucrose Polyol with an Ethylene Oxide Cap

To three (3) pounds of the product of Example IV in a stirred autoclave were added 2.5 g potassium hydroxide, water stripped at 100°/vacuum for ½ hour, and 11.25 pounds of a 80:20 (w:w) ethylene oxide propylene oxide mixture added at 110°–130° C. Mixture was digested until pressure drop was complete. Three pounds of this product was charged to 5-gallon pressure reactor with 6 g potassium hydroxide, water removed as above, and 3 pounds ethylene oxide added at 120° C. to prepare a product having an hydroxyl number of 14.8. When tested (Example XIIIj), this product performed successfully as a demulsifier for bitumen emulsions.

EXAMPLE IX

Preparation of Sucrose Polyols with about 66 and 68% Ethylene Oxide Present

The stepwise procedure of Example I was repeated using sucrose 8-molar propoxylate and a 70:30 (w:w) mixture of ethylene oxide and propylene oxide to prepare a 26,400 molecular weight (basis hydroxyl number) polyol having 68% ethylene oxide. When tested (Example XIIIl), this product$^{(x)}$ showed acceptable activity as a demulsifier for bitumen emulsions. A product$^{(y)}$ prepared in the same way having a molecular weight of 13,000 and 65.7% ethylene oxide showed only borderline activity as a demulsifier.

EXAMPLE X

Preparation of Low Molecular Weight Sucrose Polyol

The stepwise procedure of Example I was repeated using sucrose 8-molar propoxylate and a 90:10 (w:w) mixture of ethylene oxide and propylene oxide to prepare a 5,800 molecular weight polyol. When tested (Example XIIIm), this product failed as a demulsifier for bitumen emulsions.

EXAMPLE XI

Preparation of High Molecular Weight Sucrose Polyol

The procedure of Example I was used on the product of Example X with more 90:10 oxide mixture to prepare a 18,500 molecular weight polyol, basis hydroxyl number. When tested (Example XIIIn), this product performed successfully as a demulsifier for bitumen emulsions.

EXAMPLE XII

Preparation of High Molecular Weight Diol

A 5-gallon stirred autoclave was charged with three (3) pounds of the product of Example VI and 2 g potassium hydroxide. Mixture was stripped at 120° C./1 mm Hg for 1 hour and 3 pounds of a 90:10 ethylene oxide:propylene oxide mixture added at 120° C. and digested to a minimum pressure to prepare a 26,300 molecular weight diol, basis hydroxyl number. When tested (Example XIIIo), this product performed successfully as a demulsifier for bitumen emulsions.

EXAMPLE XIII

The following basic testing procedure was employed:
(a) A 1% solution of each chemical was prepared (in H$_2$O or in toluene).
(b) 100 ml of fresh, hot bitumen emulsion of known bitumen content obtained by in situ steam flooding in tar sand pattern located at Ft. McMurray, Alberta, Canada was poured into a sample bottle.
(c) 50 parts (volume) of Wizard Lake crude was added as diluent to 100 parts bitumen contained in the emulsion.
(d) Chemical was added to the diluted emulsion at the following concentrations: 10, 20, 30, 50, 75 and 100 ppm.
(e) Contents of the bottles were mixed and placed in an oven at 180°–200° F. for a 24 hour period.
(f) BS & W determinations were made on the oil layer and for some systems the oil content in the water layer was estimated by the following method:
  (i) A series of color standards were prepared by dissolving 750, 500, 250, 200, 150, 100, 75, 50 and 25 ppm by weight of bitumen directly in 1,1,1-trichloroethane.
  (ii) 5 ml of the water layer in a sample bottle was transferred to a separatory funnel.
  (iii) The water aliquot was extracted with 25 ml of 1,1,1-trichloroethane and the extract filtered to remove solids.
  (iv) The extracted solvent was compared as to color with the prepared standards in identically sized vials (Dilution of the extract with more solvent was used if necessary). From this comparison, the original oil content of the water was estimated.

With each emulsion, a blank was also run in which no chemical agent was introduced. Similar results were obtained from all these blanks; namely, the sample consisted of a thin upper layer consisting mainly of diluent (sometimes containing substantial water), a broad middle layer consisting of unbroken emulsion and a small (sometimes non-existant) dark water layer containing particles or chunks of solid bitumen and clay.

Specific test results are summarized in the table on the following page. Example XIIIb represents the first successful reduction to practice of this invention. Comparisons are made in several cases to Polyox®WSR-301, a typical demulsifier disclosed in Reference G. Successful examples are given of demulsifiers of functionality 2–8. Example X demonstrates the necessity of having a greater than or equal to 10,000 molecular weight demulsifier. Example IX shows the necessity of a greater than or equal to about 68 weight % ethyleneoxy content demulsifier, and Examples I, V and VII are negative examples also, having neither of these two requirements. Examples IV and VIII are successful demulsifiers possessing some discreet hydrophobic and hydrophilic blocks in addition to the random alkyleneoxy chains. In addition to the tests recorded on the following table, the product of Example IV was compared directly with Polyox®WSR-301 in a slip stream test. The use of the product of Example IV gave similar results to those obtained using Polyox and gave a sharper interface than Polyox especially at higher concentrations. However, the product of Example IV left some clay in the oil phase and Polyox did not.

TABLE

EXAMPLE XIII
Demulsifier Testing

| Example XIII | Candidate Demulsifier* | % Bitumen in Emulsion | % BS & W in Oil (ppm chemical used) | Treated Emulsion Middle Phase | Water Phase |
|---|---|---|---|---|---|
| a | Product of Example I | 12–16 | 11(100) | unstable interfaces | substantial oil present |

TABLE-continued

EXAMPLE XIII
Demulsifier Testing

| Example XIII | Candidate Demulsifier* | % Bitumen in Emulsion | % BS & W in Oil (ppm chemical used) | Treated Emulsion Middle Phase | Water Phase |
|---|---|---|---|---|---|
| b | Product of Example II | 17 | 3(20) | medium to thin | muddy |
| c | Product of Example III | 17 | 26(30) | thin to none | muddy |
| d | Product of Example IV | 22 | 9(20), 6(30) | thin | light, cloudy; 7500 ppm (at 20 ppm chemical), 6000(30) |
| e | Polyox ® WSR-301 | 22 | 3(20), 5(30) | thin | light, muddy; 12,000 ppm oil (20), 3000(30) |
| f | Product of Example V | 19 | mainly diluent in layer | wide | muddy, dark |
| g | Product of Example VI | 43 | 26(20), 24(100) | none | muddy, light |
| h | Polyox WSR-301 | 43 | 30(20), 28(30) | wide | clear, yellow |
| i | Product of Example VII | 27 | mainly diluent | wide | dark, muddy with bitumen chunks |
| j | Product of Example VIII | 27 | 3(20), 2(50) | none | cloudy translucent with 2500 ppm oil (at 20,50 ppm chemical) |
| k | Polyox WSR-301 | 27 | 4(20), 2(50) | narrow to none | cloudy to clear with 1250 ppm oil (20), 2500(50) |
| l | Products of Example IX | 22 | (x)3.5(30),5(50) | small | very dark, muddy with chunks of bitumen |
|   |   |   | (y)4.5(20), 3(50) | moderate, unstable interfaces | muddy, dark with bottom deposit |
| m | Product of Example X | 24 | mainly diluent | large to moderate | very dark, muddy with chunks of bitumen |
| n | Product of Example XI | 32 | 4.5(20,50) | narrow | muddy, medium brown |
| o | Product of Example XII | 27 | 15(20), 12(100) | practically none | muddy, medium brown |

We claim:

1. A process for recovering petroleum from oil-in-water bitumen emulsions by demulsifying said emulsions by adding thereto a water soluble polyol demulsifier of from about 2 to about 8 functionality said polyol being made by reacting mixed ethylene oxide and propylene oxide with polyol initiators wherein the ethylene oxide content of the polyol demulsifiers is from about 68% to about 95% and the molecular weight of the polyol demulsifier is greater than about 10,000.

2. A process as in claim 1 wherein the demulsifiers are prepared by alkoxylation of a polyol initiator of less than about 500 molecular weight.

3. A process as in claim 1 wherein the demulsifier is present with the emulsions at concentrations ranging from about 1 to about 200 parts per million.

4. The process of claim 1 wherein an organic diluent is present.

5. The process of claim 1 wherein the demulsification takes place at a temperature of from about 25° to about 120° C.

* * * * *